United States Patent [19]

Ouchi et al.

[11] Patent Number: 5,325,364
[45] Date of Patent: Jun. 28, 1994

[54] METHOD FOR ERROR CORRECTION AND CIRCUIT FOR REALIZING SAME

[75] Inventors: Yasuhide Ouchi, Koganei; Hajime Aoi, Tachikawa; Yoshihisa Kamo, Musashimurayama; Yosuke Seo, Sagamihara; Hitoshi Kakuta, Kokubunji, all of Japan

[73] Assignee: Hitachi, Ltd., Tokyo, Japan

[21] Appl. No.: 412,514

[22] Filed: Sep. 26, 1989

[30] Foreign Application Priority Data

Sep. 28, 1988 [JP] Japan .................. 63-240979

[51] Int. Cl.$^5$ .................................. G06F 11/00
[52] U.S. Cl. ...................... 371/13; 371/36; 371/69.1
[58] Field of Search ............... 371/13, 51.1, 69.1, 371/12, 30, 39.1, 36, 40.1, 68.1, 37.4; 360/53, 38.1

[56] References Cited

U.S. PATENT DOCUMENTS

| | | | |
|---|---|---|---|
| 3,681,578 | 8/1972 | Stevens | 371/36 |
| 3,863,215 | 1/1975 | McGrogan, Jr. | 371/36 |
| 4,227,175 | 10/1980 | Newman | 371/69.1 |
| 4,394,763 | 7/1983 | Nagano et al. | 371/13 |
| 4,458,349 | 7/1984 | Aichelmann, Jr. et al. | 371/13 |
| 4,577,332 | 3/1986 | Brenig | 371/69.1 |
| 4,667,317 | 5/1987 | Baggen | 371/69.1 |
| 4,670,880 | 6/1987 | Jitsukawa et al. | 371/69.1 |
| 4,868,789 | 9/1989 | MacDonald | 371/10.1 |
| 5,033,047 | 7/1991 | Uehara | 371/16.1 |

FOREIGN PATENT DOCUMENTS

| | | | |
|---|---|---|---|
| 0252037 | 10/1989 | Japan | 371/35 |
| 2029170 | 3/1980 | United Kingdom | 371/36 |

Primary Examiner—Robert W. Beausoliel, Jr.
Assistant Examiner—Phung M. Chung
Attorney, Agent, or Firm—Antonelli, Terry, Stout & Kraus

[57] ABSTRACT

An error correction circuit which includes a specification circuit for specifying erroneous portions in a first data set reproduced from a recording medium, a register for storing the reproduced first data set including the erroneous portions thus specified and a reproducing circuit responsive to the reproduced first data set for reproducing again the first data set from the recording medium to obtain retry data, when there exist erroneous portions in the reproduced first data set stored in the register. The correction circuit also includes a data replace circuit, connected to receive the retry data, for replacing information at the specified erroneous portions in the reproduced first data set stored in the register by information at corresponding portions in the retry data.

11 Claims, 13 Drawing Sheets

METHOD FOR ERROR CORRECTION AND CIRCUIT FOR REALIZING SAME

BACKGROUND OF THE INVENTION

The present invention relates to a recording device and in particular to a method for error correction and a circuit for realizing the same, which is suitable for recording/reproducing information more precisely.

A prior art method for error correction will be explained. An error correction code (hereinbelow abbreviated as ECC) having an ability to effect correction is added to a prior art data format. The data and an ECC are inputted to a circuit for error correction as input data. When errors are within the ability of error correction, the circuit for error correction corrects them to obtain correct data which is provided as output data. When they exceed the ability of error correction, the data is reread (hereinbelow called retry). Nevertheless, if there are errors exceeding the ability of error correction, it is often impossible to reproduce correct data.

The prior art techniques described above are disclosed in JP-A-48-74753 (corresponding to U.S. application Ser. No. 212544, filed on Dec. 27, 1971), JP-A-49-91560 (corresponding to U.S. application Ser. No. 317986, filed on Dec. 26, 1972), and JP-A-53-132951 (corresponding to U.S. Pat. No. 4,100,403).

SUMMARY OF THE INVENTION

According to the prior art techniques described above, it was impossible to restore information correctly in the case where errors exceeding the ability of error correction of the error correction code were produced. For example, when an error correction code capable of correcting burst errors at one position was used, in the case where burst errors were produced at a plurality of positions, it was impossible to restore information correctly. The object of the present invention is to provide a method for error correction and a circuit for realizing the same which is capable of restoring information correctly, even if errors which cannot be corrected by the prior art techniques as described above are produced.

In order to achieve the above object, according to the present invention, a method for error correction is provided, by which data is reproduced a plurality of times for the same digital information source and correct data is reproduced by synthesizing portions other than erroneous portions in a plurality of data sets thus reproduced.

According to another practical form of the invention, a method for error correction is provided, by which data is reproduced a plurality of times for the same digital information source; erroneous positions are specified in at least one set among a plurality of data sets thus reproduced; the erroneous positions are memorized; and information at least at the erroneous portions thus specified is replaced by information at the same portions in another data set as the erroneous portions.

According to another aspect of the present invention a circuit for error correction is provided, which circuit provides for specifying erroneous portions in a data set reproduced from a recording medium; for storing the erroneous portions thus specified; for reproducing again the same portions in the recording medium as the erroneous portions to obtain retry data, when there exist erroneous portions at least in the data set thus reproduced; and for replacing information at the specified erroneous portions in the reproduced data set by information at the same portions in the retry data.

According to still another aspect of the present invention a file control device is provided, which comprises a first switch for branching data read-in from a file driving device; a register connected with a branch of the first switch for storing the data thus read-in; a path connected with the other branch of the first switch; a second switch for switching over the data outputted by the register and those outputted by the path to transmit them to a device of higher rank; a parity check circuit for specifying erroneous positions in the data stored in the register; and an address control circuit for switching the second switch to the path side, when the erroneous portions in the stored data are outputted by the register.

Firstly, it is important to utilize information of data including errors as far as possible. This is made possible by using a register, in which data is stored temporarily, for example. Secondly, in order to replace erroneous positions by correct data, it is necessary to specify them. This is made possible by disposing simple check bits for examining whether the data is erroneous or not. Furthermore, it is possible to obtain correct data by using a control circuit which transmits data while replacing the content of the register by a correct one based on the address information of the errors.

DESCRIPTION OF THE PREFERRED EMBODIMENTS

Hereinbelow the embodiments of the present invention will be explained.

Figure 1:
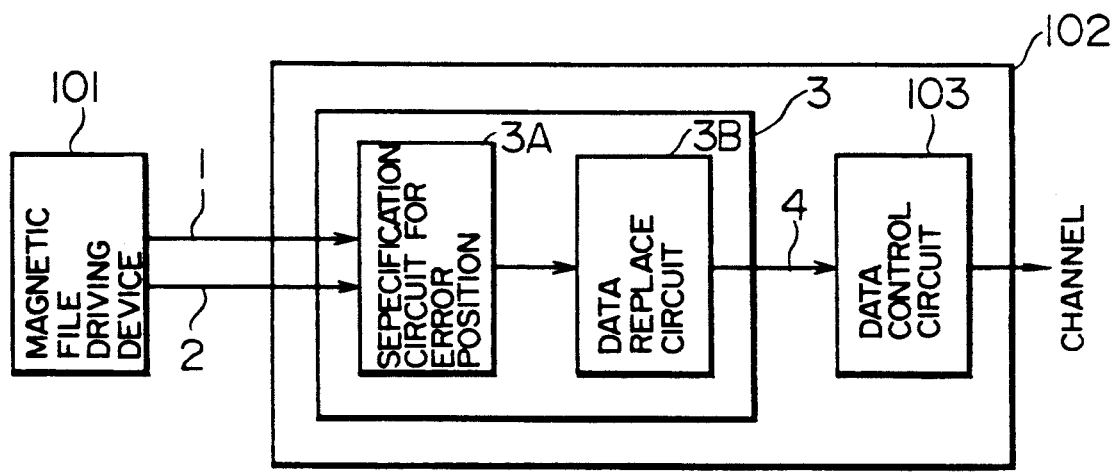
FIG. 1 is a schematic diagram illustrating the construction of a magnetic file reading apparatus embodying the present invention.

FIG. 1 shows the basic arrangement of the present invention, in which a magnetic file driving device 101 comprises at least one magnetic head and one magnetic disk. Data read-in by this magnetic file driving device 101 is transmitted to a CPU, etc. through channels after having been subjected to various processings. A data control circuit 103 controls which driving device should be accessed, when data is read-out by a plurality of magnetic file driving devices 101 and stored therein. In FIG. 1 only one driving device is indicated and the others are omitted. The data read-in by the magnetic file driving device 101 can contain errors. It is also one of the roles of the magnetic file control device 102 to correct such errors to obtain correct data by some method. In the present embodiment a new control circuit, i.e. a data replace circuit 3 is included in the magnetic file control device 102 in order to correct data containing errors to obtain correct data.

Now it is supposed that data 1 obtained by reproducing a certain turn of information (hereinbelow called a record) in the magnetic file driving device 101 contains errors. The data 1 is inputted in a specification circuit for error position 3A. The function of this specification circuit for error position 3A is to specify which part of the data 1 contains errors. For this purpose the specification of the error position is effected by means of parity check or use of an ECC. At this time, in the case where the errors exceed the ability of error correction of the ECC, it is impossible to correct them to obtain correct data. Therefore, the information is reread-in (retry). It is known generally that among these errors particularly those due to thermal noises in the circuit or the head are produced at random. The error position in the data 1 and that in the data 2 obtained by the retry, both of which are reproduced from the same record, differ often from each other. In the present embodiment data 4 which is more correct than the data 1 is obtained by using this fact. For this purpose the position in the data 1 specified by the specification circuit for error position 3A may be replaced by the corresponding position of the data 2 obtained by retry by means of a data replace circuit 3B. The elements necessary for replacing data can comprise control circuits, such as switches necessary for replacing data, apart from a counter and a memory for managing the place (address) in the data.

Figure 2:
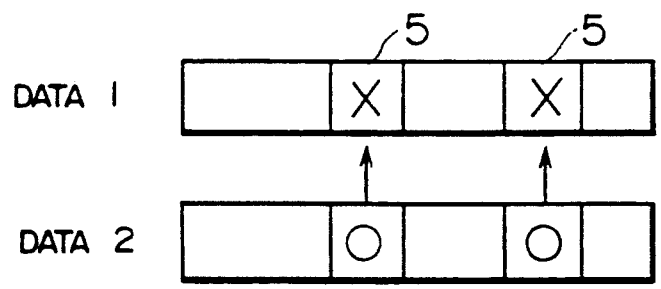
FIG. 2 is a diagram indicating the principle of the present invention.

The principle by which correct data can be obtained as described above will be explained, referring to FIG. 2. It is supposed that the data 1 contains an error 5. If there is no error in the data 2 reproduced from the same record at the same position as the data 1, the correct data can be obtained by replacing the erroneous part in the data 1 by the corresponding part in the data 2. Here, in the case where the data 1 or the data 2 contain no errors or in the case where the errors can be corrected by some method, they may be adopted as the correct data as they are. For example, when the general error correction code (ECC) is used, the data after the correction may be adopted as the correct data.

In the present embodiment the number of data sets inputted in the data replace control circuit 3 is not limited to 2, but this method can be easily extended to more than 2 data sets. This is true for all the following embodiments. However, for the sake of the simplicity of the explanation, in the following, the number of data sets is supposed to be 2.

Figure 3:
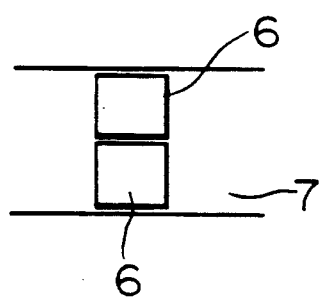
FIGS. 3 and 4 are diagrams showing the arrangement of magnetic heads, which can be applied to the present invention.
Figure 4:
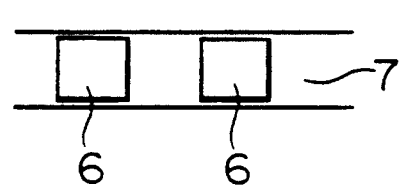

Further, what is usable for the data in the present embodiment is usable for various data. In a typical case, the data 1 is typical reproduced data and the data 2 is retry data, as explained above. In addition it is usable for different data sets obtained by reproducing data recorded in the same track 7 by means of a plurality of magnetic heads 6, as indicated in FIGS. 3 and 4, and read-out by means of the head 6. Although, in the following embodiments, explanation will be made for the former case of the reproduced data containing errors and the retry data, it is obvious that it can be applied also to the latter case. Furthermore, the data 1 and 2 are not necessarily inputted simultaneously in parallel, but the present invention includes also the case in which a plurality of data sets are inputted serially. For example, in the case of the reproduced data and the retry data described above, they are inputted serially and therefore one input terminal is sufficient. In FIG. 1, input lines 1 and 2 are drawn separately for convenience' sake. Still further, although a case where the present invention is applied to a magnetic file system is indicated here, it can be applied also to other types of file systems, e.g. an optical file system.

Figure 5:
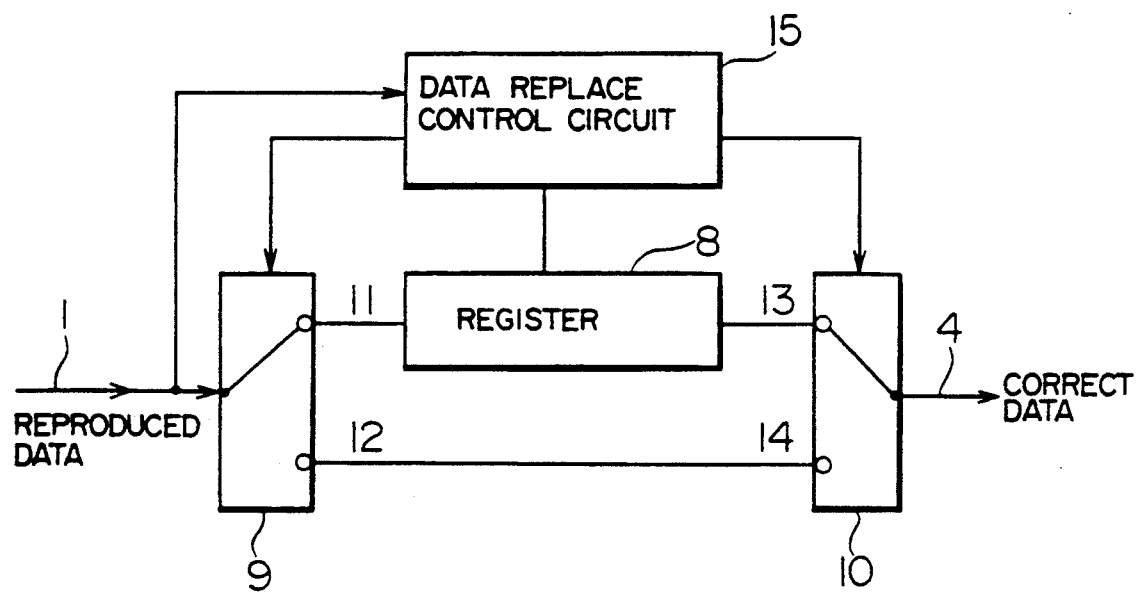
FIG. 5 is a schematic diagram illustrating the construction of an embodiment of the present invention.

FIG. 5 shows an embodiment of the data replace circuit 3 in accordance with this invention.

The present embodiment is characterized in that, in order to replace the data, there is disposed a register for storing the reproduced data 1 containing errors. It is operated as follows. At first, the reproduced data 1 is stored in the register 8 through a path 11. Then error positions in the data 1 are detected by the data replace control circuit 15 and at the same time the same record as the data 1 is reread-in (retry) after having turned a switch 9 to the other path 12. Next, in the case where the data is transmitted to a higher rank device through a channel, the correct data can be obtained by switching-over the switch 10 by means of the data replace control circuit 15. Concretely speaking, for the positions of the correct data among the reproduced data 1 in the register 8, the switch 10 is turned to the path 13 and for the positions of the erroneous data, it is turned to the path 14 to select the retry data. At this time, the error positions in the retry data are detected by the data replace control circuit 15, and only in the case where the retry data have no errors at the same positions as the error positions in the reproduced data, they may be transmitted to the higher rank device as useful data.

In this embodiment the register 8 for storing the retry data may be disposed in the path 12-14. The length of the register 8 is sufficiently equal to one unit length for processing the data, i.e. the length corresponding to one record. Further, the switches 9 and 10 can be replaced by another construction having an identical function.

Figure 6:
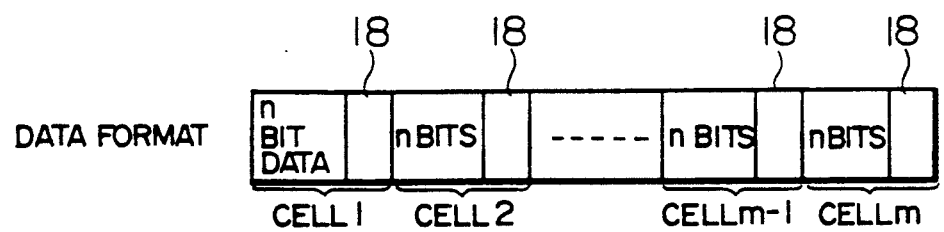
FIGS. 6 and 7 are diagrams of a conceptual data arrangement for explaining an embodiment of the present invention.
Figure 7:
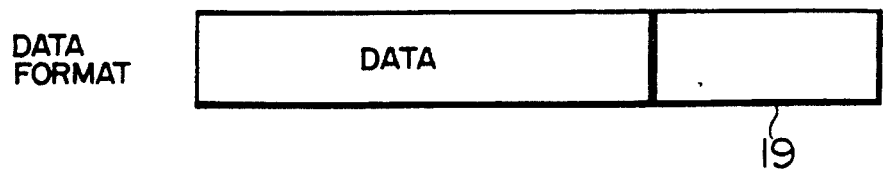

FIGS. 6 and 7 show still another embodiment based on an error correction method which is directed to data having a data format including a parity check bit for detecting error positions in the data. This parity check bit is disposed for every bit length (n bits) predetermined for the data and by examining the data and the check bit it can be known whether there are errors within the bit length. Consequently, it is known where there are errors within the record. A typical example of the parity check bit is the even parity. The even parity is a system, by which a check bit is added so that the sum of "1"s in the data of n bits and the check bit is always an even number. It is obvious that another parity check system is also useful, if it can indicate clearly the error positions.

In the present embodiment, a method, by which a parity check bit 18 is disposed in the data for every n bits as indicated in FIG. 6, and another method, by which parity check bits 19 for all the data are disposed after the data as indicated in FIG. 7, can be applied equally well.

Figure 8:
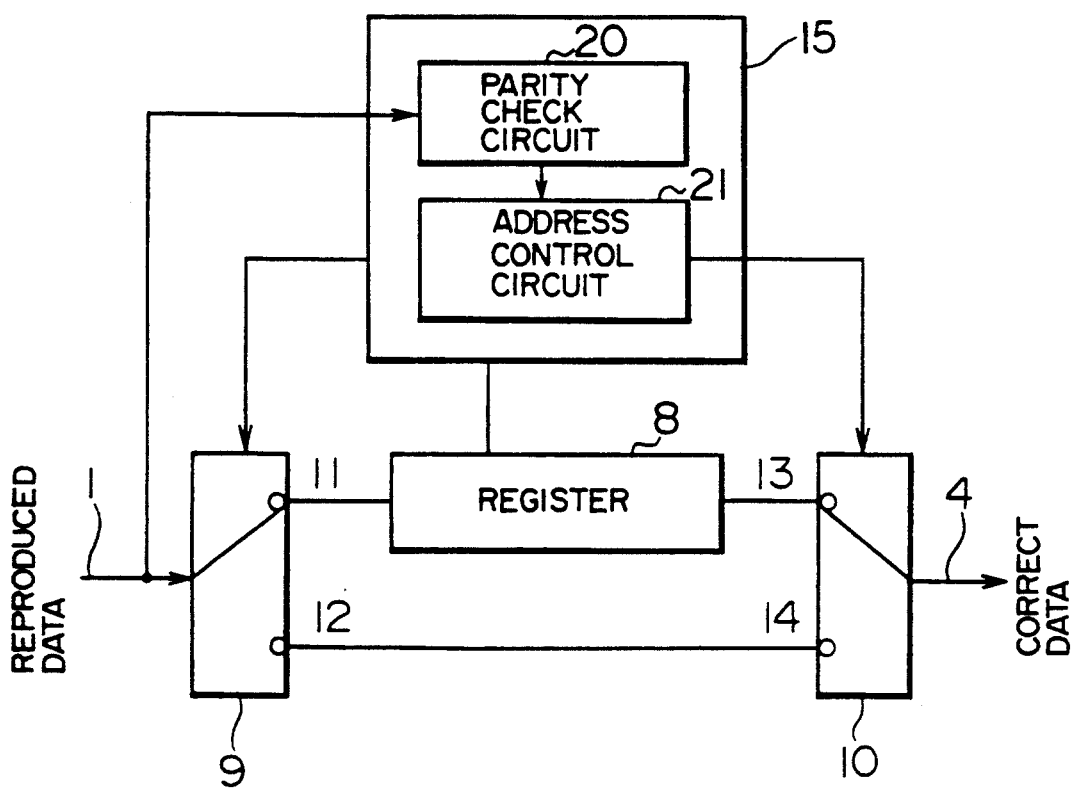
FIG. 8 is a schematic diagram of an embodiment of the present invention.

FIG. 8 indicates the construction of the circuit in the present embodiment.

The data replace control circuit 15 consists of a parity check circuit 20 and an address control circuit 21. The error positions in the reproduced data 1 and the retry data are detected by the parity check circuit 20 which transmits the information to the address control circuit 21, and the data including no errors are selected by switching the switch 10 by means of the address control circuit 21 to obtain the correct data 4. Reference numeral 8 represents a register just as in FIG. 5.

Figure 9:
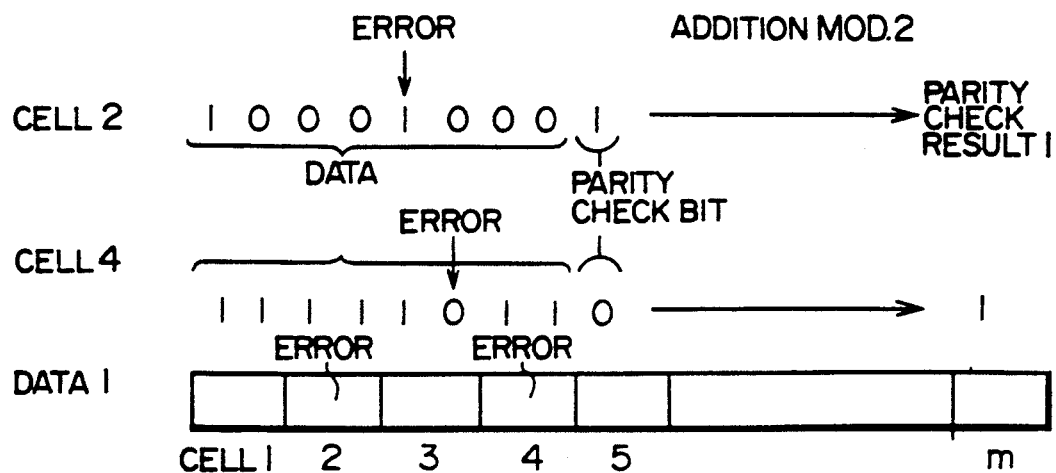
FIG. 9 shows a data format for explaining an embodiment of the present invention.
Figure 10:
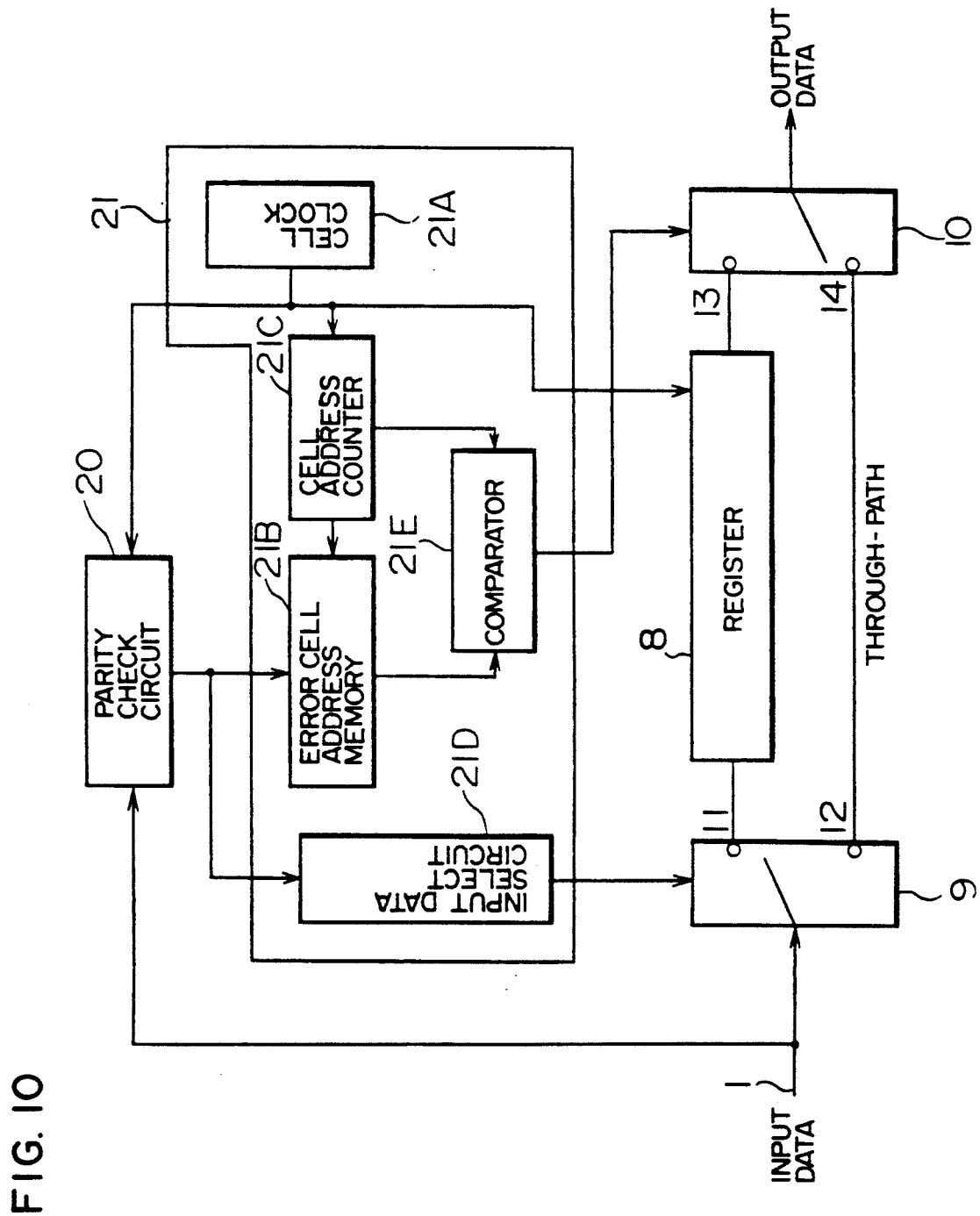
FIG. 10 is a diagram of an embodiment of the present invention in detail.
Figure 11:
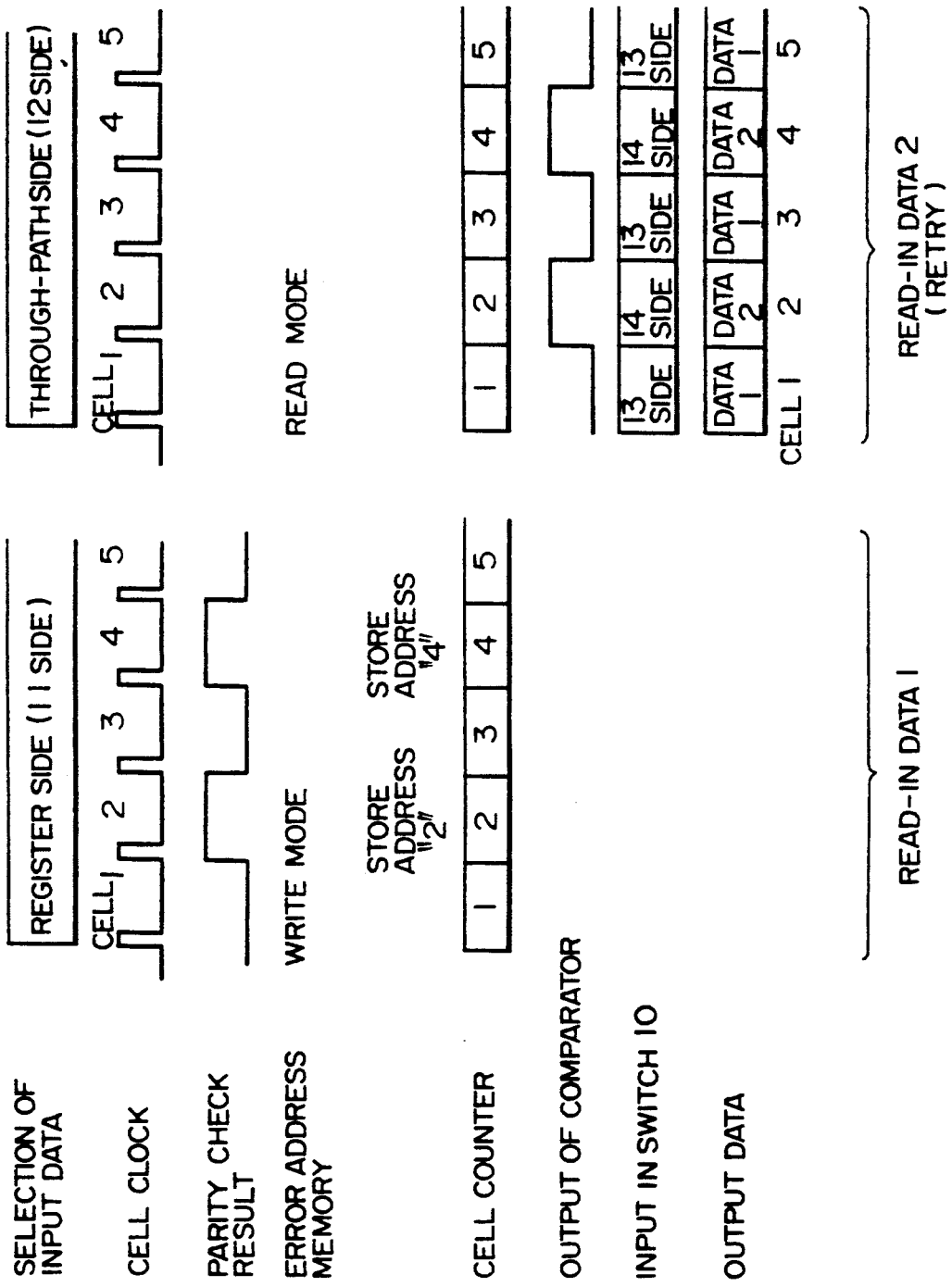
FIG. 11 is a time chart for explaining an embodiment of the present invention.

The operation described above will be explained in detail, referring to FIGS. 9 to 11, in which FIG. 9 shows the data format; FIG. 10 indicates the circuit in FIG. 8 more in detail; and FIG. 11 is a time chart showing the operation of the circuit indicated in FIG. 10. One block consisting of the data and the parity check bit in the data format indicated in FIG. 6 is called a cell. Now, it is supposed that errors are found in the data in cell 2 and cell 4, as indicated in FIG. 9. These cells are included in the input data 1 in FIG. 10. The data 1 is inputted to the parity check circuit 20 and at the same time stored in the register 8. At this time, in order to input the data in the register 8, a terminal 11 of the switch 9 is selected by an input data select circuit 21D. In the parity check circuit 20, as indicated in FIG. 11, the parity check is effected with a timing of a cell clock. The parity check is effected by adding all the data bits and the parity bit modulo 2, as indicated in FIG. 9. Consequently the parity check results are 1 (high) for Cell 2 and Cell 4 and 0 (low) for the other cells. By using these parity check results and addresses in a cell address counter 21C, the error positions in the data 1, i.e. cells "2" and "4", are stored in an error cell address memory 21B. Next, since errors are found in the data 1, reread of the information, i.e. retry, is effected. The instruction of this retry may be issued on the basis of the judgment on the parity check result. When the retry is effected, since the data 1 is stored in the register 8, a terminal 12 of a switch 9 is selected by the input data select circuit 21D in order to make the retry data 2 pass through the through-path side. By effecting the retry, only the error positions in the data 1 stored in the register 8 are replaced by the retry data 2 to obtain the output data. By this method, while the retry data is read-in, the address counted by a cell address counter 21C is compared with the address stored in the error cell address memory 21B by a comparator 21E. Only in the case where they are in accordance with each other, i.e. only the cells in which the errors are found in the data 1, output "high" to select a terminal 14 of the switch 10 to output the retry data 2 and for the other cells the terminal 13 is selected to output the data 1 stored in the register 8. The timing of the data 1 and that of the retry data 2 is synchronized by a cell clock 21A. At this time the parity check is effected also for the retry data 2 by the parity check circuit 20 and only in the case where no errors are found at the same positions as the data 1 will the data be outputted as correct data. In the case where errors are found at the same positions, the retry is effected again. By the operation described above it is possible to replace the error positions in the data 1 by the retry data 2 to obtain correct data.

Figure 12:
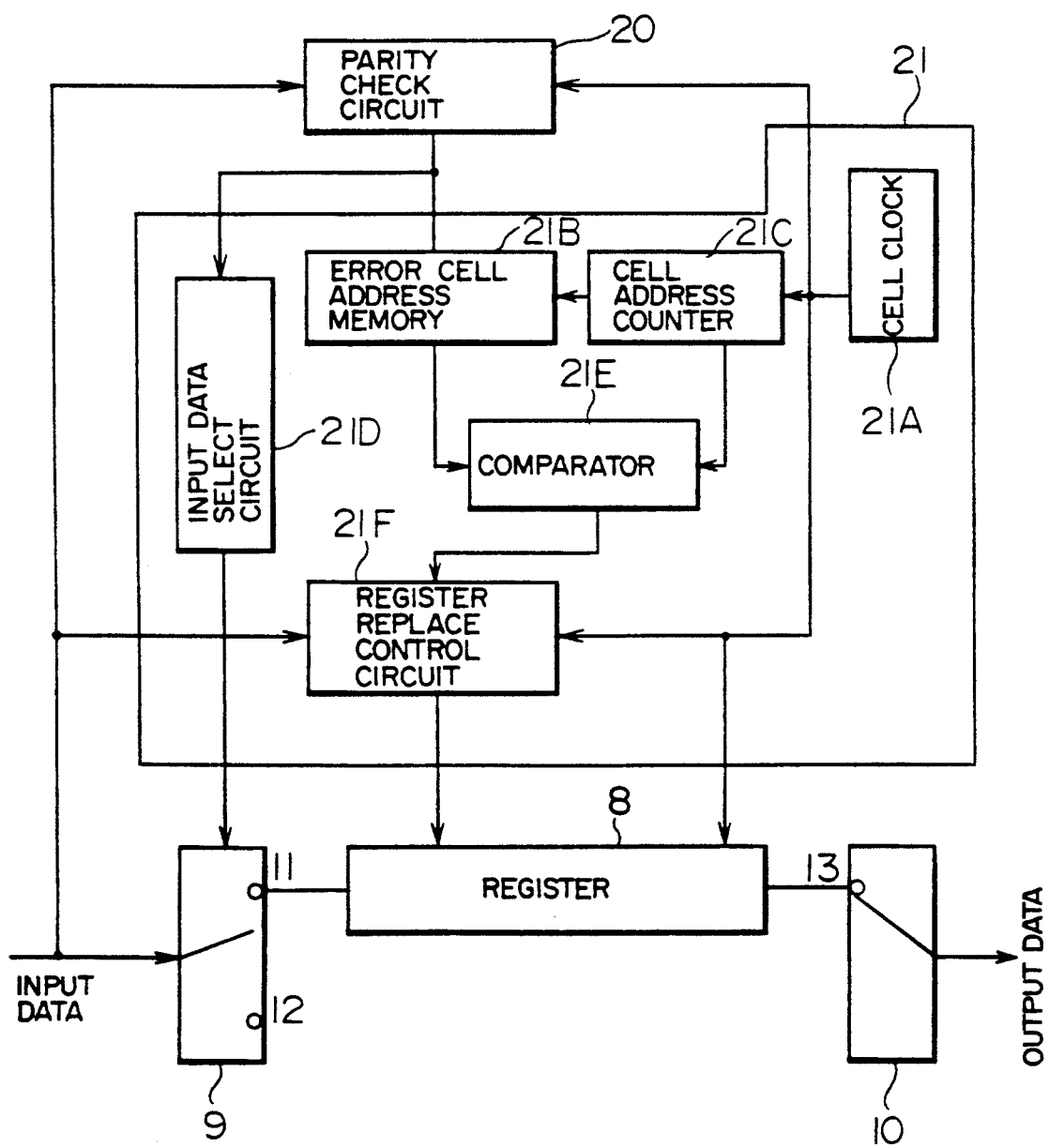
FIG. 12 is a diagram of an embodiment of the present invention.
Figure 13:
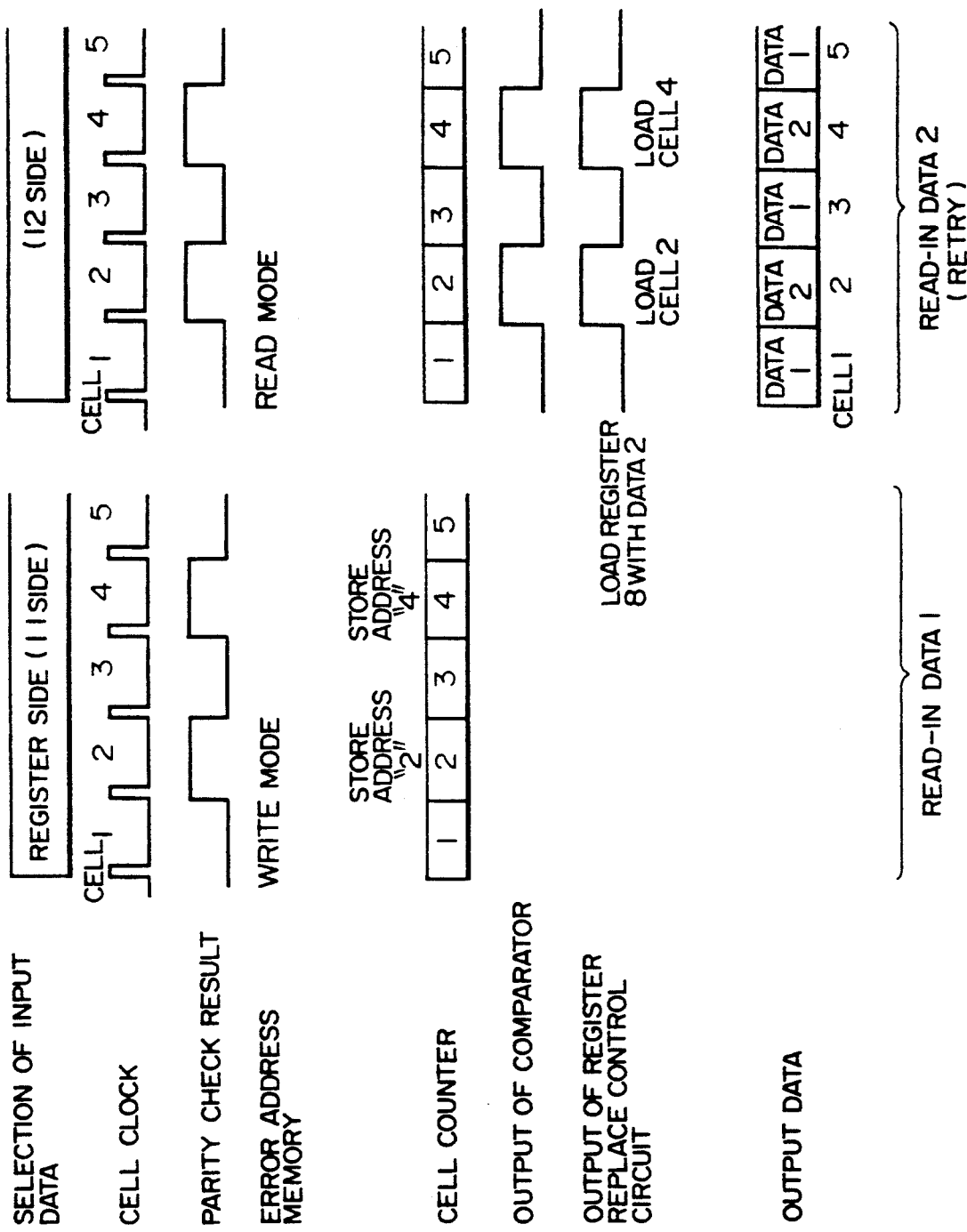
FIG. 13 is a diagram of a conceptual data scheme for an embodiment of the present invention.

FIGS. 12 and 13 show the construction of another circuit according to the present invention and the operation thereof. In FIG. 12, while the retry data is read-in, by using the output of a comparator 21E and the data 2, all the cells at the error positions in the data 1 stored in the register 8 are replaced by the data of the same cells in the data 2 by means of a register replace control circuit 21F. As the result, e.g. in the register 8 only cells 2 and 4 are those in the data 2 and the others are those in the data 1. The other operations are identical to those described, referring to FIGS. 10 and 11.

Figure 14:
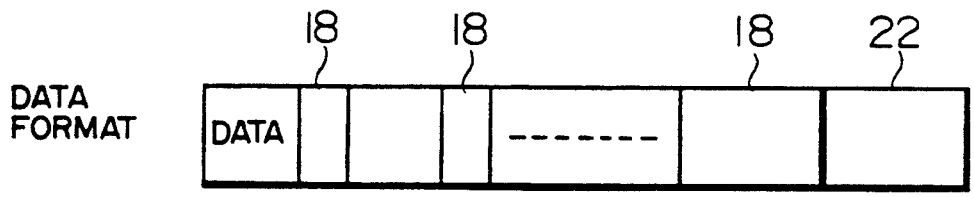
FIGS. 14 and 15 are diagrams of conceptual data schemes for explaining an embodiment of the present invention.
Figure 15:
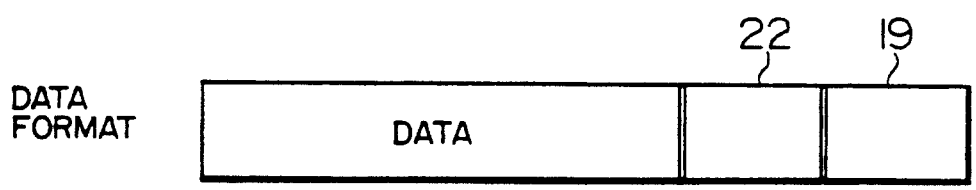

Next still another embodiment is shown in FIGS. 14 and 15. This is an embodiment, in which the present invention is applied to the data format having the ECC used generally for a prior art magnetic recording device. In the present embodiment the data format includes an ECC 22 apart from a parity check bit 18 or 19.

Figure 16:
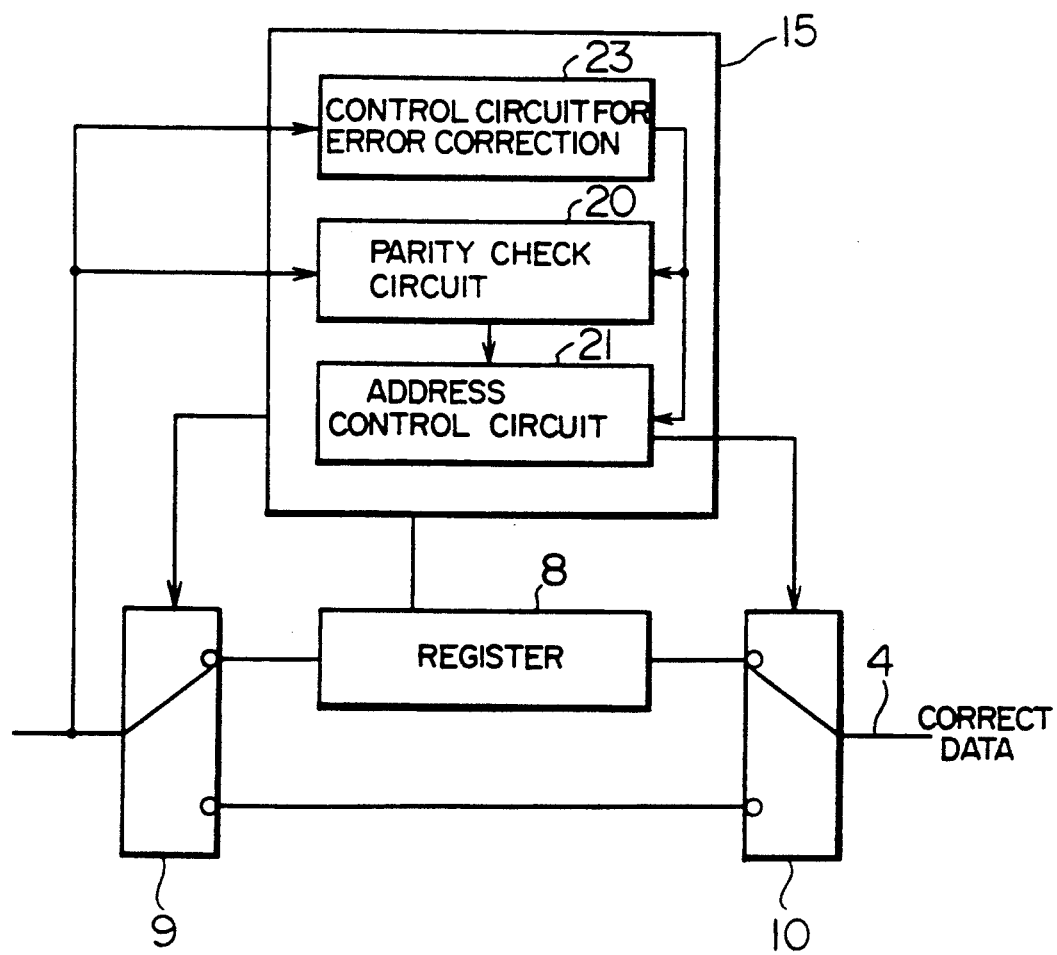
FIG. 16 is a diagram of an embodiment of the present invention.

FIG. 16 illustrates the construction of the circuit in the present embodiment. The data replace control circuit 15 consists of a parity check circuit 20, an address control circuit 21 and a control circuit for error correction 23. The ECC check of the reproduced data and the retry data is effected by the control circuit for error correction 23 and only in the case where uncorrectable errors are found will the parity check circuit 20 and the address control circuit 21 be started. The operations of the parity check circuit 20 and the address control circuit 21 are identical to those described in the embodiment indicated in FIG. 8 and the correct data is restored by replacing the error positions in the data 1 by the corresponding positions in the retry data 2.

Figure 17:
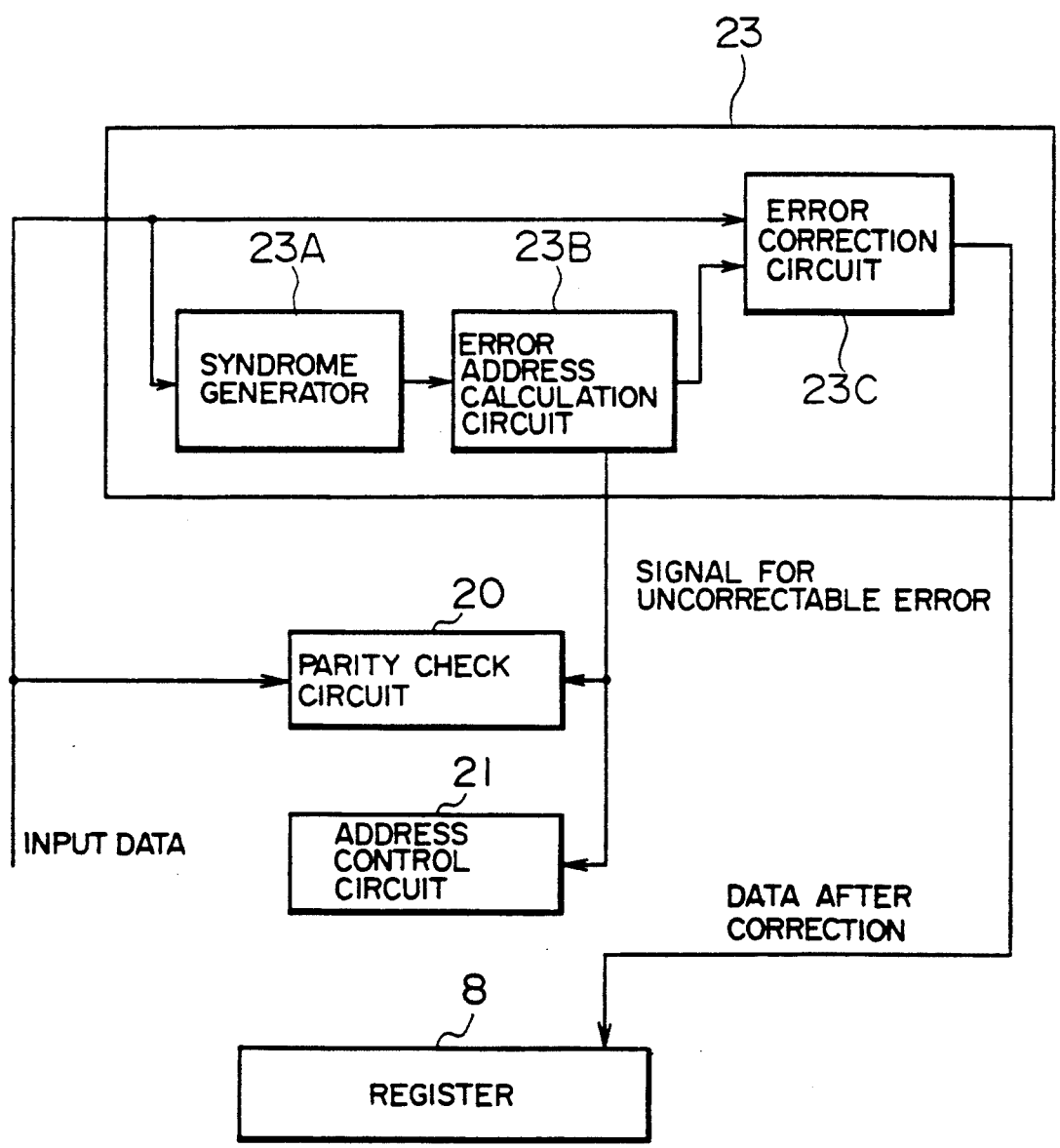
FIG. 17 is a block diagram of an embodiment of the present invention.

The operation described above will be explained, referring to FIG. 17. A syndrome is calculated by a syndrome generator 23A, starting from the input data inputted in the control circuit for error correction 23. By using this syndrome, an error address calculation circuit 23B finds where there are errors. At this time, if the error address can be calculated correctly without any contradiction, an error correction circuit 23C corrects the errors to obtain the correct data. The data 23D after the correction may be transmitted either to the register 8 or to the exterior as the correct data as they are. The operation described above is identical to the usual method for error correction using ECC. In the present embodiment, when the error address cannot be calculated correctly in the operation described above, i.e. when the errors are uncorrectable, a signal indicating such conditions, i.e. a signal for uncorrectable error 23E, is transmitted by the error address calculation circuit to start the parity check circuit 20 and the address control circuit 21. The operation after the start of parity check is identical to that described in the embodiment indicated in FIG. 8. As explained above, by the present embodiment, even if errors are found, it is not necessary to replace data, when the errors can be corrected by using ECC.

Figure 18:
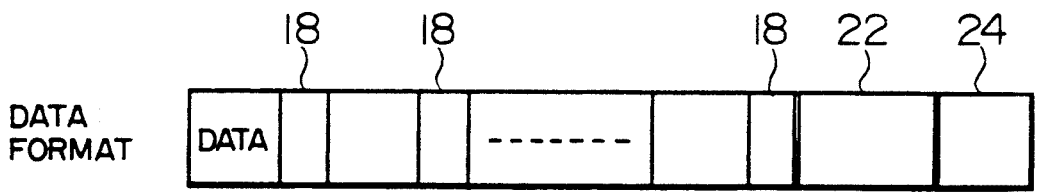
FIGS. 18 and 19 are diagrams of conceptual data schemes for explaining an embodiment of the present invention.
Figure 19:
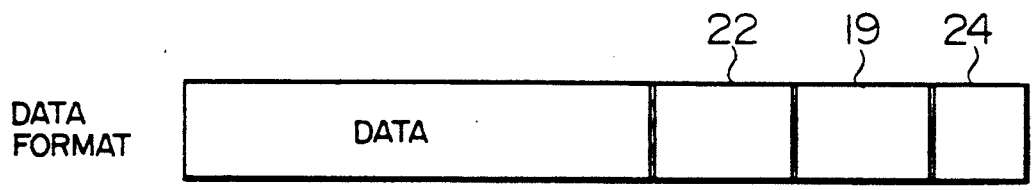

Next FIGS. 18 and 19 illustrate still another embodiment.

In the present embodiment there is disposed an ECC 24 exclusively used for the parity check bit in addition to the embodiment indicated in FIGS. 14 and 15. Owing to this fact the reliability of the parity check, i.e. the reliability of the error position detection, is improved.

Figure 20:
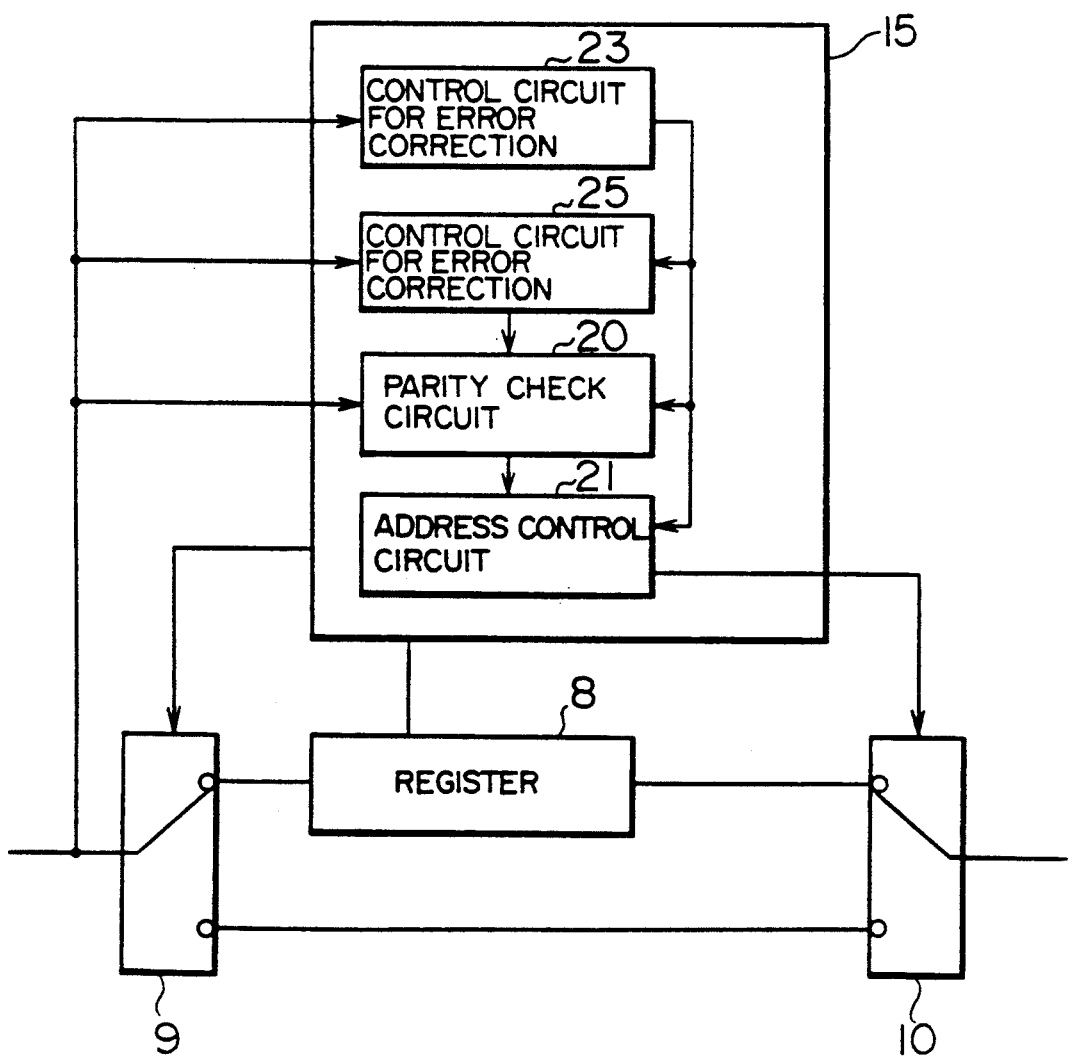
FIG. 20 is a diagram of an embodiment of the present invention.

The construction of the circuit used in the present invention is indicated in FIG. 20.

The data replace control circuit 15 consists of a parity check circuit 20, an address control circuit 21, a control circuit for error correction 23 and a control circuit for error correction 25 exclusively used for the parity check bit. The operation after the correction of the parity check bit by the control circuit for error correction 25 is identical to that described in the embodiment in FIG. 16.

Figure 21:
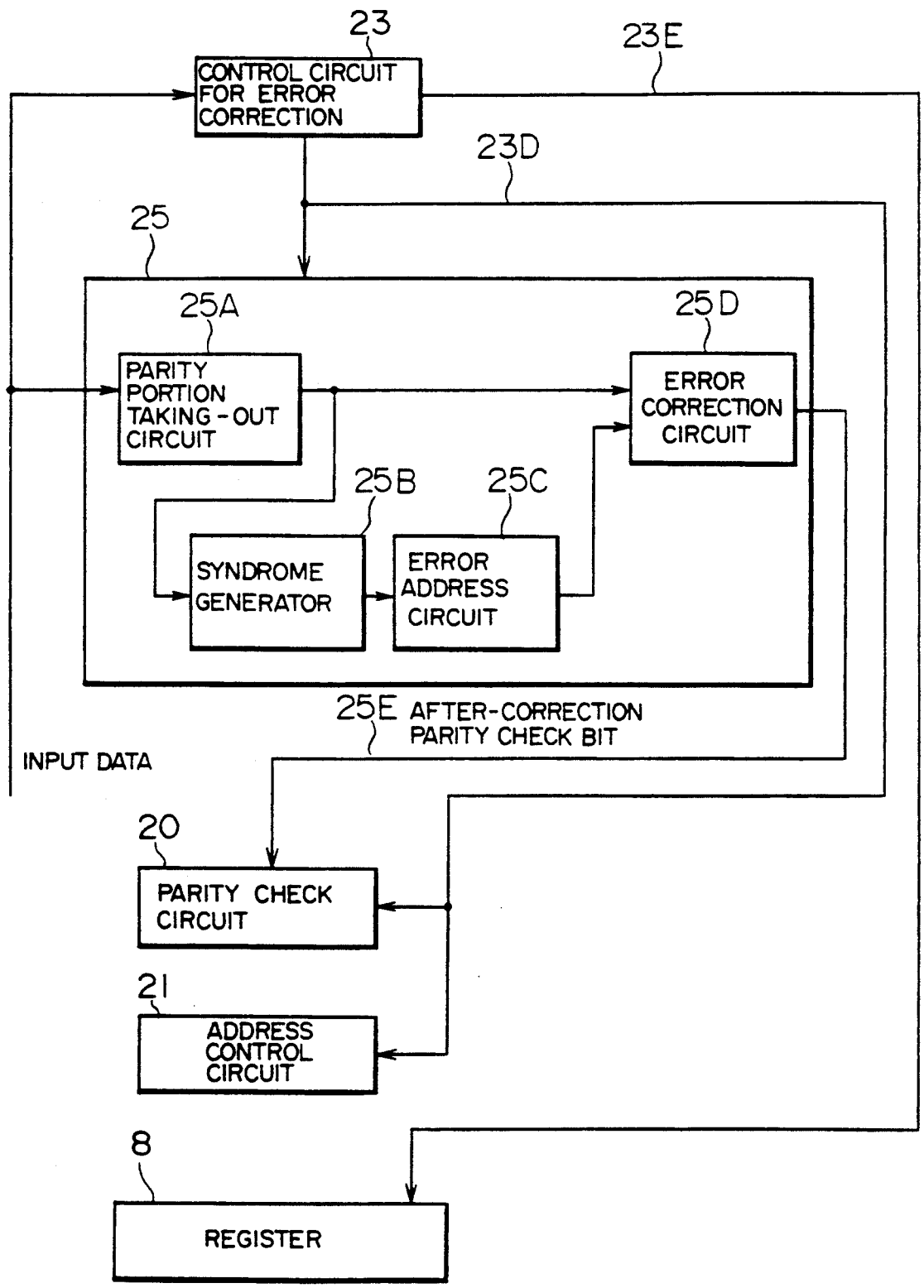
FIG. 21 is a block diagram of an embodiment of the present invention.

The operation described above will be explained, referring to FIG. 21. The parity check circuit 20, the address control circuit 21 and the control circuit for error correction 25 exclusively used for the parity check bit are started, only when the signal for uncorrectable error 23D is outputted by the control circuit for error correction 23. In the control circuit for error correction 25 exclusively used for the parity check bit, at first the parity check bit 18 or 19 and the ECC 24 for the parity check bit are taken-out by a parity portion taking-out circuit 25A. The errors, which are only in the parity portion, are corrected by the syndrome generator 25B, the error address calculation circuit 25C and the error correction circuit 25D to obtain an after-correction parity check bit 25E and the parity check is effected by the parity check circuit 20 using this parity check bit. Consequently, in the present embodiment, even if errors are found to a certain degree in the parity check bit, since they are corrected, a more correct data replace can be effected.

Figure 22:
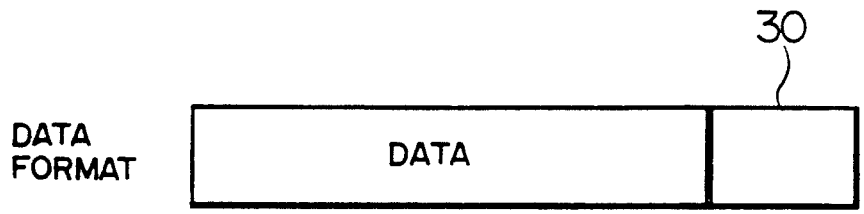
FIG. 22 is a diagram of a conceptual data scheme for explaining an embodiment of the present invention.

Next, FIG. 22 shows still another embodiment.

The present embodiment is characterized in that an ECC capable of specifying the error positions, even in the case where the errors are uncorrectable, is used instead of a prior art ECC. In this case no parity check bit is necessary. The ECC used here should be able to detect and correct errors for every cell consisting of several bits as a unit. Further, it is desirable that the error detecting power is high, however not so high as the error correcting power. That is, it is desirable that, when M errors are correctable and N errors are detectable, N is greater than M.

Figure 23:
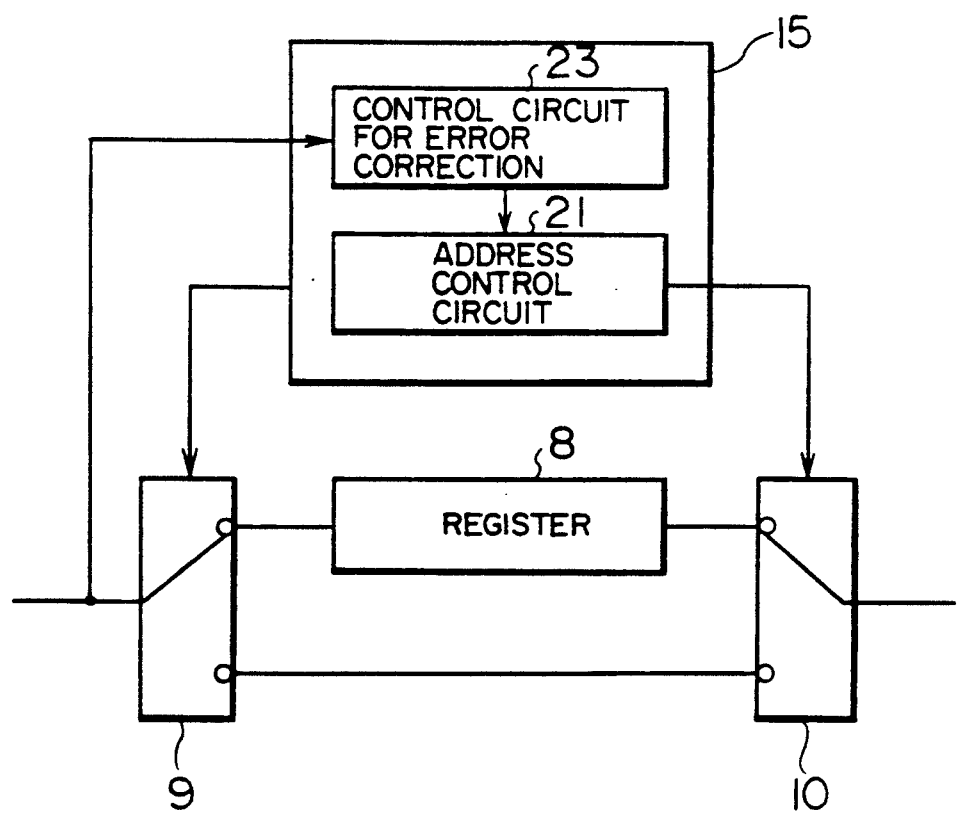
FIG. 23 is a diagram of an embodiment of the present invention.

FIG. 23 illustrates the construction of the circuit used in the present embodiment.

The data replace control circuit 15 consists of an address control circuit 21 and a control circuit for error correction 23. Since it is possible to specify the error positions by means of the control circuit for error correction 23, the information can be transmitted directly to the address control circuit 21.

Figure 24:
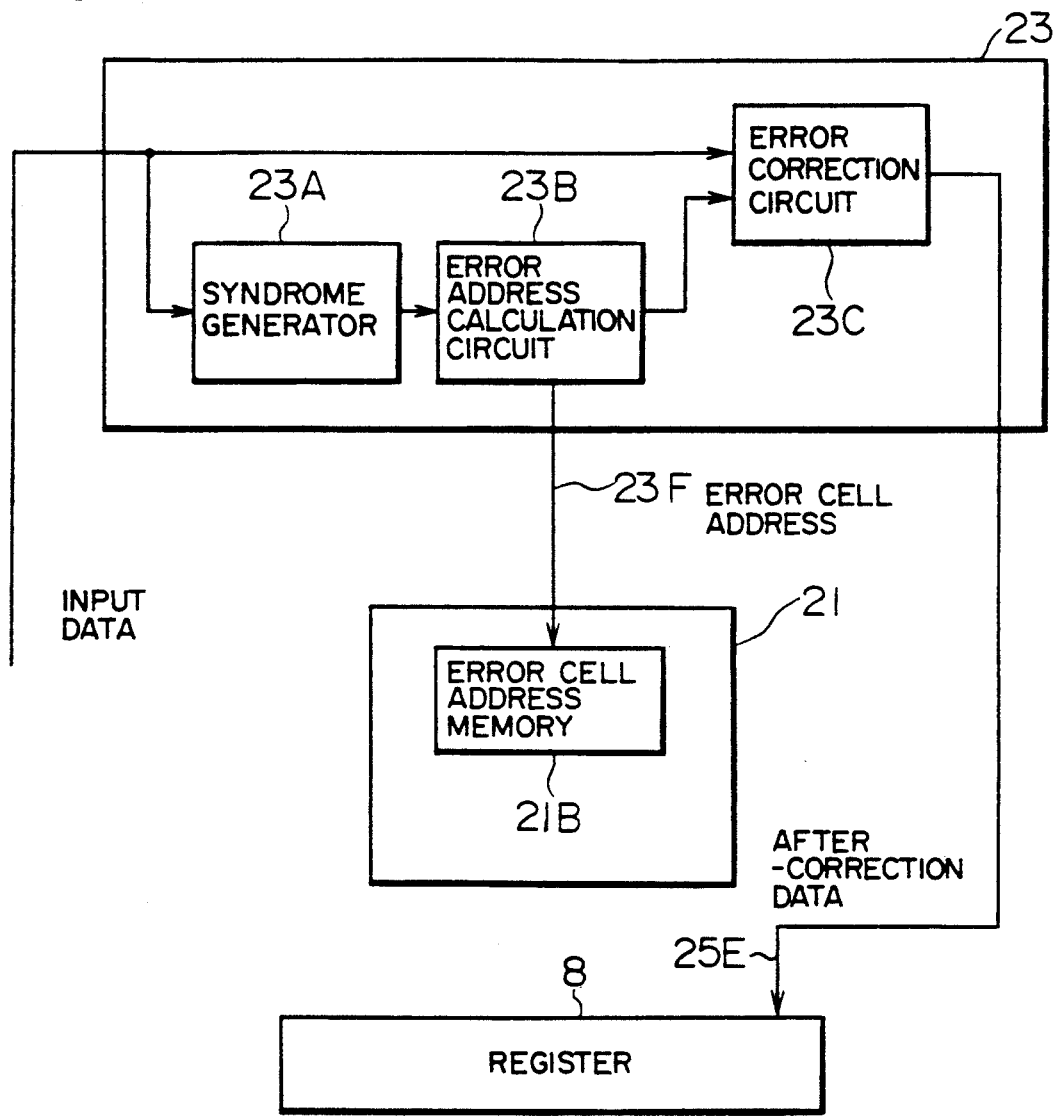
FIG. 24 is a block diagram of an embodiment of the present invention.

The operation described above will be explained, referring to FIG. 24. At first, it is detected by means of the syndrome generator 23A and the error address calculation circuit 23B where the errors are. Since the ECC used in the present embodiment can detect the error positions, even if the error correction is impossible, it is possible to specify the error address. Consequently the data replace operation is possible, when this error cell address 23F is inputted directly in the error cell address memory 21B of the address control circuit 21. Since the ECC used here detects and corrects the errors for every cell putting several bits together as a unit and the error address is expressed in a cell unit, the error cell address can be inputted directly in the error cell address memory 21B.

Figure 25:
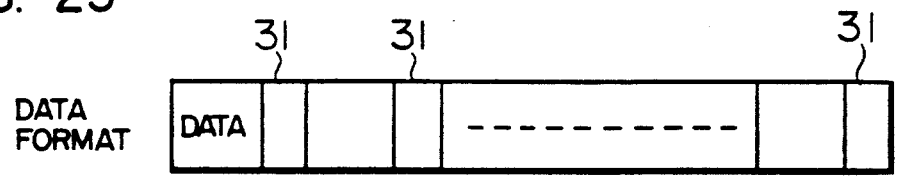
FIGS. 25 and 26 are diagrams of conceptual data schemes for explaining an embodiment of the present invention.
Figure 26:
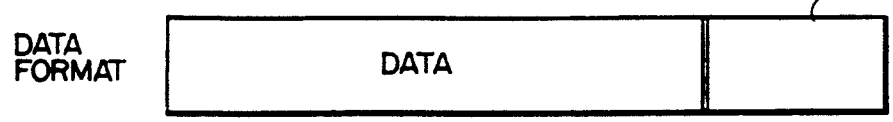

Next, still another embodiment is illustrated in FIGS. 25 and 26.

The present embodiment is characterized by a data format having ECCs 31 formed by dividing the prior art ECC so that the object of correction for each of them is a small region and having an ECC 32 collecting them. In this case the ECC 31 can be shorter than the ECC 22.

The construction of the circuit used in the present embodiment is identical to that used in the embodiment indicated in FIG. 23.

According to the present invention, it is possible to specify the error positions in the reproduced data and to replace the erroneous data by correct data. In this way, even in the case where the data cannot be restored correctly by the prior art techniques, it can be reproduced correctly. Consequently, the reliability of the data is improved. It is possible to reduce the number of times of the retry and an effect is obtained also for increase in the throughput.

We claim:

1. A circuit for error correction, comprising:
   means for specifying erroneous portions in a first data set reproduced from a recording medium;
   means for storing said reproduced first data set including the erroneous portions thus specified;
   means responsive to said reproduced first data set for reproducing again said first data set from the recording medium to obtain retry data, when there exist erroneous portions in the reproduced first data set stored in said storing means; and
   means connected to receive said retry data for replacing information at the specified erroneous portions in the reproduced first data set stored in said storing means by information at corresponding portions in the retry data.

2. A method of error correction of digital data, comprising the steps of: specifying where a plurality of error positions are in at least one data set among a plurality of data sets reproduced successively from the same data repeatedly provided by an information source; storing said error positions; and replacing data at said plurality of error positions in said at least one data set by correct data obtained from positions corresponding to said error positions in at least one other data set.

3. A method for error correction according to claim 2, in which the digital data is stored in at least one register.

4. A circuit for error correction, comprising:
   a first switch having a first branch and a second branch for switching data read-in from a recording medium;
   a register connected to said first branch of said first switch for storing data thus read-in;
   a path connected to said second branch of the first switch;
   a second switch coupled to said register and said path for switching between data outputted by the register and data outputted by said path to transmit one of said data to a device;
   parity check means responsive to said data read-in from said recording medium for specifying erroneous portions in data stored in the register; and
   address control means responsive to said parity check means for switching the second switch to said path, when erroneous portions in the stored data are outputted by the register and for otherwise switching said second switch to said register, whereby correct data are supplied to said device from said second switch.

5. A circuit for error correction according to claim 4, further comprising:
error correction control means responsive to said data read-in from the recording medium for correcting errors in said data using parity check bits in said data read-in; and
means responsive to said error correction control means for starting operation of said parity check means and said address control means, only when uncorrectable errors are found.

6. A circuit for error correction according to claim 5, further comprising second error correction control means responsive to the data read-in from the recording medium for correcting errors in the parity check bits.

7. A method of error correction for use in a system handling digital data having a data format which has a plurality of cells, comprising:
reproducing the same data a plurality of times from the same digital information source to provide a plurality of data sets;
specifying a cell contained in at least one data set from among the reproduced data sets in which an error is generated;
storing a position in the data format of said cell having the generated error; and
replacing information contained in said cell having the generated error located at said stored position by information in a cell contained at the same stored position in another reproduced data set, to thereby produce correct data.

8. A method according to claim 7, wherein said digital information source includes a magnetic disc and a magnetic head.

9. A circuit for error correction, comprising:
first memory means for storing a data set reproduced from a recording medium;
means for specifying erroneous portions in the data set stored in said first memory means;
second memory means for storing positions of erroneous portions thus specified;
means for reproducing again the same portions of said data set from the recording medium to obtain retry data, when there exist erroneous portions at least in the data set thus reproduced; and
means for replacing data at the specified erroneous portions in the data set stored in the first memory means with data derived from the same positions in the retry data according to the positions of the erroneous portions stored in the second memory means, whereby correct data is produced.

10. A circuit for error correction, comprising:
a first switch which has a first terminal and a second terminal for branching data read-in from a recording medium;
a register connected to the first terminal of the first switch for storing data thus read-in;
a path connected to the second terminal of the first switch;
a second switch which has a third terminal and a fourth terminal for switching over data outputted by the third terminal connected to the register and data outputted by the fourth terminal connected to the path, so as to transmit data to a device;
parity check means responsive to data read-in from said recording medium for specifying erroneous positions in data stored in the register; and
address control means responsive to said parity check means for switching the second switch to the fourth terminal, when erroneous portions in the stored data are outputted by the register, so that corrected data is output by said second switch.

11. A circuit for error correction according to claim 10, further comprising:
error correction control means responsive to data read-in from said recording medium for correcting errors in the data read-in from the recording medium; and
means responsive to said error correction control means for starting operation of said parity check means and said address control means, only when uncorrectable errors are found by said error correction control means.

* * * * *